US012659412B2

(12) United States Patent
Tsujimoto et al.

(10) Patent No.: US 12,659,412 B2
(45) Date of Patent: Jun. 16, 2026

(54) IMAGE FORMING APPARATUS CONTROLLING OPERATION BASED ON DETECTED PHYSICAL PROPERTY

(71) Applicant: Konica Minolta, Inc., Tokyo (JP)

(72) Inventors: Takahiro Tsujimoto, Toyokawa (JP); Akinori Kimata, Toyokawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 18/331,648

(22) Filed: Jun. 8, 2023

(65) Prior Publication Data

US 2023/0412741 A1 Dec. 21, 2023

(30) Foreign Application Priority Data

Jun. 15, 2022 (JP) ................................ 2022-096376

(51) Int. Cl.
*H04N 1/00* (2006.01)
*H04N 1/23* (2006.01)

(52) U.S. Cl.
CPC ..... *H04N 1/00244* (2013.01); *H04N 1/00347* (2013.01); *H04N 1/0057* (2013.01);
(Continued)

(58) Field of Classification Search
CPC ........... H04N 1/00244; H04N 1/00347; H04N 1/00724; H04N 1/2323; H04N 1/2338; H04N 1/2392; H04N 1/00092; H04N 1/00726; H04N 1/00734; H04N 1/00779; H04N 1/2353; H04N 1/6097; G06F 3/1204; G06F 3/1205; G06F 3/1226;
(Continued)

(56) References Cited

U.S. PATENT DOCUMENTS 5,228,118 A * 7/1993 Sasaki ..................... G06F 3/126
358/1.15
5,745,145 A * 4/1998 Hirabayashi ........... B41J 2/2056
347/183

(Continued)

FOREIGN PATENT DOCUMENTS

JP 2006058261 A * 3/2006
JP 2008-102261 A 5/2008

(Continued)

OTHER PUBLICATIONS

Office Action, dated Feb. 3, 2026, which was issued for the corresponding Japanese Patent Application No. 2022-096376, 15 pages, with English translation.

*Primary Examiner* — Scott A Rogers
(74) *Attorney, Agent, or Firm* — LUCAS & MERCANTI, LLP

(57) ABSTRACT

An image forming apparatus that forms an image on a recording medium includes a detection section, an acquisition section, and a hardware processor. The detection section detects a physical property of the recording medium. The acquisition section acquires predetermined data related to the recording medium from an outside of the image forming apparatus. The hardware processor controls an operation in the image forming apparatus based on a detection value detected by the detection section and the predetermined data acquired by the acquisition section.

17 Claims, 9 Drawing Sheets

(52) U.S. Cl.
CPC ....... *H04N 1/00724* (2013.01); *H04N 1/2323* (2013.01); *H04N 1/2338* (2013.01); *H04N 1/2392* (2013.01); *H04N 2201/0082* (2013.01)

(58) Field of Classification Search
CPC .... G06F 3/1232; G06F 3/1254; G06F 3/1257; G06F 3/1291
See application file for complete search history.

(56) References Cited

U.S. PATENT DOCUMENTS 6,467,866 B1 * 10/2002 Nagoshi ............... G06K 15/107 347/15
6,598,795 B1 * 7/2003 Prenn ..................... B41J 11/009 235/462.01
7,253,916 B2 * 8/2007 Imaizumi ........... H04N 1/00954 358/1.15
7,423,775 B2 * 9/2008 Tomita .................. G06F 3/1254 709/224
7,532,352 B2 * 5/2009 Yokoyama ......... H04N 1/00347 358/1.15
7,646,479 B2 * 1/2010 Kokubo ................. B41J 11/009 356/239.7
7,750,330 B2 * 7/2010 Murata .............. H04N 1/00779 250/559.4
7,831,160 B2 * 11/2010 Murakami ......... H04N 1/00724 399/45
7,986,447 B2 * 7/2011 Bang .................... H04N 1/6033 382/163
8,289,531 B2 * 10/2012 Abe ...................... G06F 3/1228 358/1.15
8,767,263 B2 * 7/2014 Obata ................ H04N 1/00867 358/1.9
8,780,391 B2 * 7/2014 Ohta ..................... G06F 3/1226 358/1.15
9,001,333 B2 * 4/2015 Endo ...................... G01N 21/55 356/446
9,075,552 B2 * 7/2015 Feng ..................... G06F 3/1229
9,121,691 B2 * 9/2015 Endo ...................... G01B 11/06
9,304,721 B2 * 4/2016 Mihira .................. G06F 3/1288
9,744,785 B2 * 8/2017 Yokozawa ......... G03G 15/5062
10,295,943 B2 * 5/2019 Sakakibara ........ G03G 15/5029
10,462,320 B2 * 10/2019 Iwamoto ............... G06F 3/1203
11,210,046 B2 * 12/2021 Shikagawa ............ G06N 20/00
11,381,692 B2 * 7/2022 Ozawa ............... H04N 1/00244
11,470,212 B2 * 10/2022 Tanaka ............... H04N 1/00724
11,496,642 B2 * 11/2022 Ohnishi ............... H04N 1/0075
11,616,892 B2 * 3/2023 Yamamoto ............ G06F 3/1205 358/1.15
11,639,068 B2 * 5/2023 Eiyama .................... B41J 29/46 347/19
11,652,928 B2 * 5/2023 Kubo ................... H04N 1/0097 358/1.13
11,763,118 B2 * 9/2023 Yamashita ............... G06N 3/08 358/1.13
11,906,919 B2 * 2/2024 Dokiya .................. G01N 21/64
12,069,208 B2 * 8/2024 Kimata .............. H04N 1/00029
12,200,175 B2 * 1/2025 Tsujimoto .......... H04N 1/00726
2004/0008365 A1 * 1/2004 Hobbs ................... G06F 3/1205 710/16
2005/0200875 A1 * 9/2005 Sugimoto .............. B41J 11/009 358/537
2009/0128848 A1 * 5/2009 Kamisuwa ......... H04N 1/32101 358/1.15
2009/0136246 A1 * 5/2009 Murakami ......... G03G 15/5029 399/45
2009/0279115 A1 * 11/2009 Martin .................. G06F 3/1204 358/1.13
2011/0002014 A1 * 1/2011 Tani ................... H04N 1/00501 358/403
2015/0022848 A1 * 1/2015 Motosugi ........... G06K 15/4095 358/1.14
2015/0116718 A1 * 4/2015 Ochi .................. G03G 15/5029 399/45
2015/0273903 A1 * 10/2015 Saito ...................... B41J 11/008 347/16
2016/0295045 A1 * 10/2016 Saiki .................... H04N 1/0032
2018/0024485 A1 * 1/2018 Naruse ............... H04N 1/00806 358/1.5
2019/0171149 A1 * 6/2019 Tsujimoto .......... G03G 15/5029
2020/0192261 A1 * 6/2020 Ogata ................ G03G 15/5025
2020/0394001 A1 * 12/2020 Kanai ................... G06F 3/1257
2021/0067647 A1 * 3/2021 Kimata .............. H04N 1/00594
2022/0177257 A1 * 6/2022 Ogata .................... B65H 29/60
2022/0179347 A1 * 6/2022 Maruyama ......... G03G 15/5016
2022/0182502 A1 * 6/2022 Maruyama ......... H04N 1/00726
2023/0009567 A1 * 1/2023 Ishihara ................... B65H 7/02
2023/0156127 A1 * 5/2023 Kimata .............. H04N 1/00092 358/1.13
2023/0288856 A1 * 9/2023 Nonoyama ........ G03G 15/6594
2023/0370556 A1 * 11/2023 Izumiya ............. H04N 1/00652
2024/0007573 A1 * 1/2024 Tsujimoto .......... H04N 1/00726
2025/0240382 A1 * 7/2025 Nozaki ................. G06F 3/1208

FOREIGN PATENT DOCUMENTS

JP 2017-042998 A 3/2017
JP 2019-095486 A 6/2019
JP 2020-097170 A 6/2020
JP 2020-104266 A 7/2020
JP 2021-130244 A 9/2021

* cited by examiner

FIG. 2

| | IR TRANSMISSION | G REFLECTION | B TRANSMISSION | IR-B |
|---|---|---|---|---|
| BRAND A | a11 | a12 | a13 | a14 |
| BRAND B | b11 | b12 | b13 | b14 |
| BRAND C | c11 | c12 | c13 | c14 |

FIG. 3

| | IR TRANSMISSION | G REFLECTION | B TRANSMISSION | IR-B | BASIS WEIGHT [g/m$^2$] |
|---|---|---|---|---|---|
| PAPER TYPE a | a31 | a32 | a33 | a34 | 60 |
| PAPER TYPE b | b31 | b32 | b33 | b34 | 100 |
| PAPER TYPE c | c31 | c32 | c33 | c34 | 150 |

FIG. 8
| | IR TRANSMISSION | G REFLECTION | B TRANSMISSION | IR-B |
|---|---|---|---|---|
| IMAGE FORMING CONDITION 1 | a21 | a22 | a23 | a24 |
| IMAGE FORMING CONDITION 2 | b21 | b22 | b23 | b24 |
| IMAGE FORMING CONDITION 3 | c21 | c22 | c23 | c24 |
| | | | | |
FIG. 9A
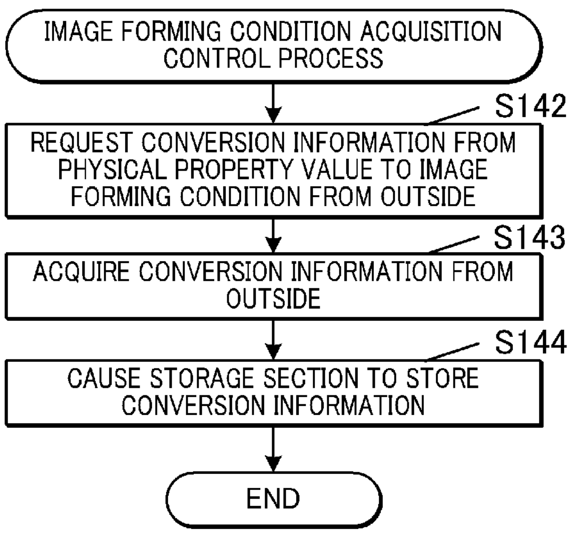
FIG. 9B
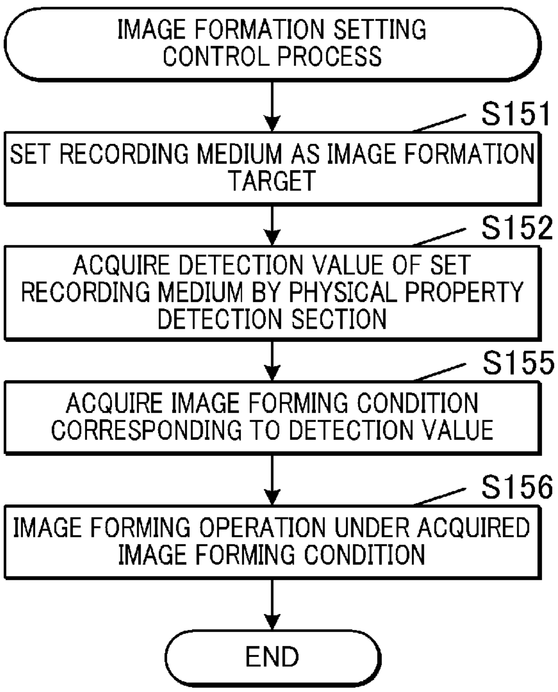

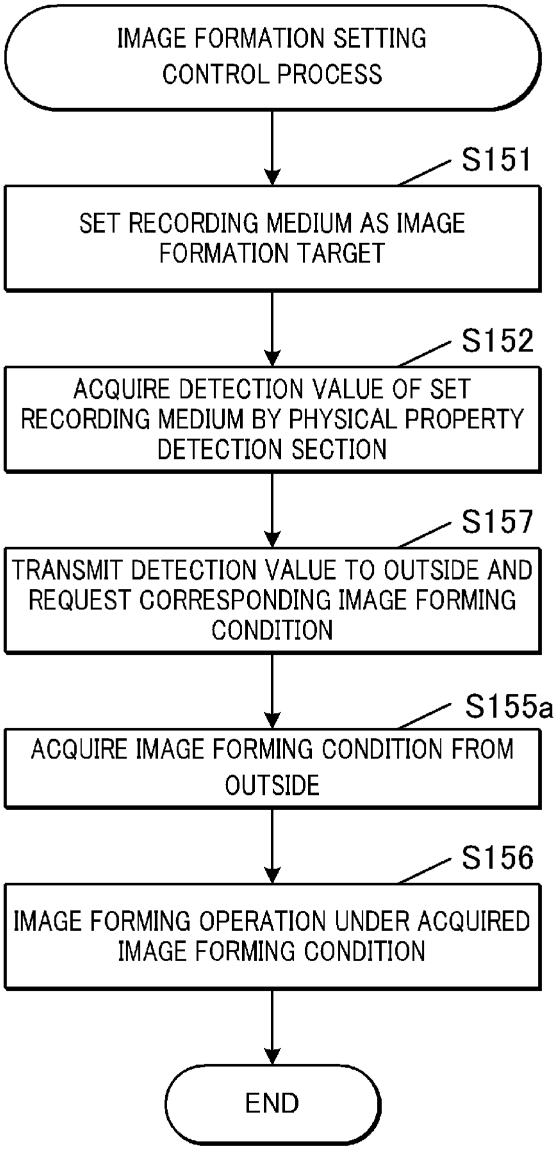

FIG. 11

IMAGE FORMATION SETTING
CONTROL PROCESS

S151
SET RECORDING MEDIUM AS IMAGE
FORMATION TARGET

S152
ACQUIRE DETECTION VALUE OF SET
RECORDING MEDIUM BY PHYSICAL PROPERTY
DETECTION SECTION

S157
TRANSMIT DETECTION VALUE TO OUTSIDE AND
REQUEST CORRESPONDING IMAGE FORMING
CONDITION

S155a
ACQUIRE IMAGE FORMING CONDITION FROM
OUTSIDE

S156
IMAGE FORMING OPERATION UNDER ACQUIRED
IMAGE FORMING CONDITION

END

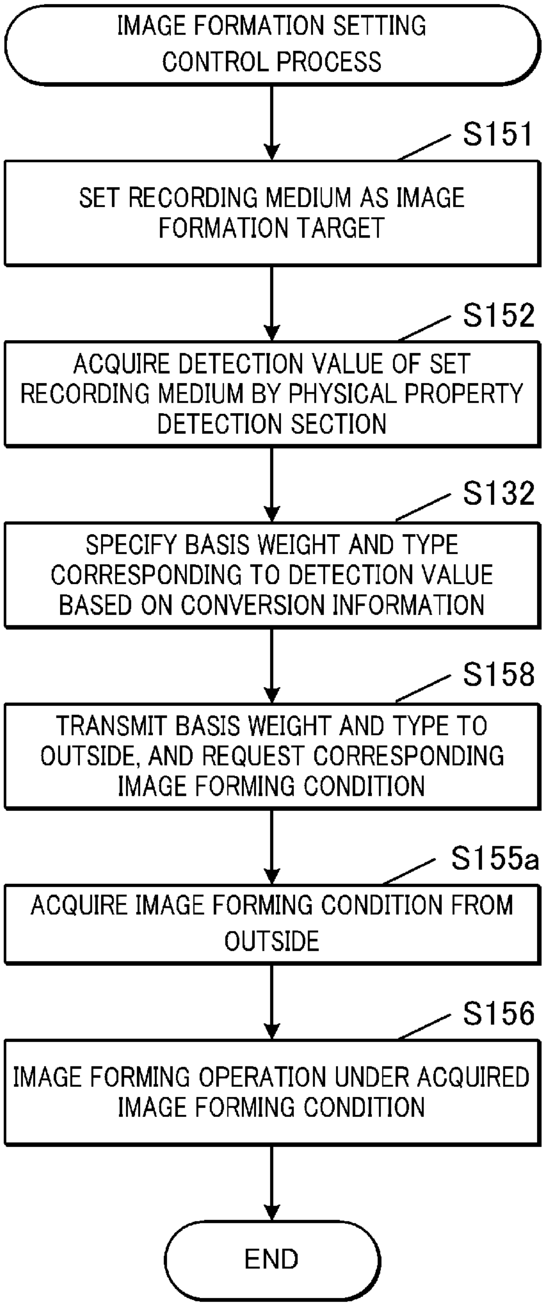

FIG. 12

IMAGE FORMATION SETTING
CONTROL PROCESS

S151
SET RECORDING MEDIUM AS IMAGE
FORMATION TARGET

S152
ACQUIRE DETECTION VALUE OF SET
RECORDING MEDIUM BY PHYSICAL PROPERTY
DETECTION SECTION

S132
SPECIFY BASIS WEIGHT AND TYPE
CORRESPONDING TO DETECTION VALUE
BASED ON CONVERSION INFORMATION

S158
TRANSMIT BASIS WEIGHT AND TYPE TO
OUTSIDE, AND REQUEST CORRESPONDING
IMAGE FORMING CONDITION

S155a
ACQUIRE IMAGE FORMING CONDITION FROM
OUTSIDE

S156
IMAGE FORMING OPERATION UNDER ACQUIRED
IMAGE FORMING CONDITION

END

IMAGE FORMING APPARATUS CONTROLLING OPERATION BASED ON DETECTED PHYSICAL PROPERTY

REFERENCE TO RELATED APPLICATIONS

The entire disclosure of Japanese Patent Application No. 2022-096376 filed on Jun. 15, 2022, is incorporated herein by reference in its entirety.

TECHNICAL FIELD

The present disclosure relates to an image forming apparatus.

DESCRIPTION OF THE RELATED ART

An image forming apparatus that forms and outputs an image on a recording medium can form a high-quality image by stably conveying the recording medium by appropriately adjusting various conditions (image forming conditions) related to an image forming operation and a recording medium conveying operation in accordance with the characteristics of the recording medium on which the image is formed. A variety of recording media are available. However, it is difficult for the user to perform adjustment depending on each recording medium.

Japanese Unexamined Patent Publication No. 2019-095486 discloses a technology in which an image forming apparatus includes a sensor that measures the physical properties of a recording medium, specifies the physical properties of the recording medium being transported from the measurement result of the sensor, and automatically sets conditions. According to this technique, time and effort of a user are reduced, and occurrence of trouble or deterioration in image quality due to an image forming operation in an inappropriate setting state or in an unset state is reduced.

SUMMARY OF THE INVENTION

However, there are many recording media on the market, and these are further changing (increasing). It is difficult for the image forming apparatus to cover and hold in advance condition settings corresponding to various recording media that change in this way. As a result, appropriate condition setting and image forming operation may be difficult.

An object of the present disclosure is to provide an image forming apparatus that can more reliably perform an appropriate operation.

To achieve at least one of the abovementioned objects, according to an aspect of the present invention, an image forming apparatus reflecting an aspect of the present disclosure is an image forming apparatus that forms an image on a recording medium, including:

a detection section that detects a physical property of the recording medium;

an acquisition section that acquires predetermined data related to the recording medium from an outside of the image forming apparatus; and a hardware processor that controls an operation in the image forming apparatus based on the detection value detected by the detection unit and the predetermined data acquired by the acquisition unit.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIG. 2 is a table illustrating an example of brand correspondence information;

FIG. 3 is a table illustrating an example of basis weight/type conversion information;

FIG. 8 is a table showing an example of a correspondence relationship between physical property values and image forming conditions;

FIG. 9A is a flowchart illustrating a control procedure of an image forming condition acquisition control process;

FIG. 9B is a flowchart illustrating a control procedure of an image formation setting control process;

FIG. 11 is a flowchart showing a second modification example of the image formation setting control process;

FIG. 12 is a flowchart showing a third modification example of the image formation setting control process;

DETAILED DESCRIPTION

Hereinafter, one or more embodiments of the present invention will be described with reference to the drawings. However, the scope of the invention is not limited to the disclosed embodiments.

Figure 1:
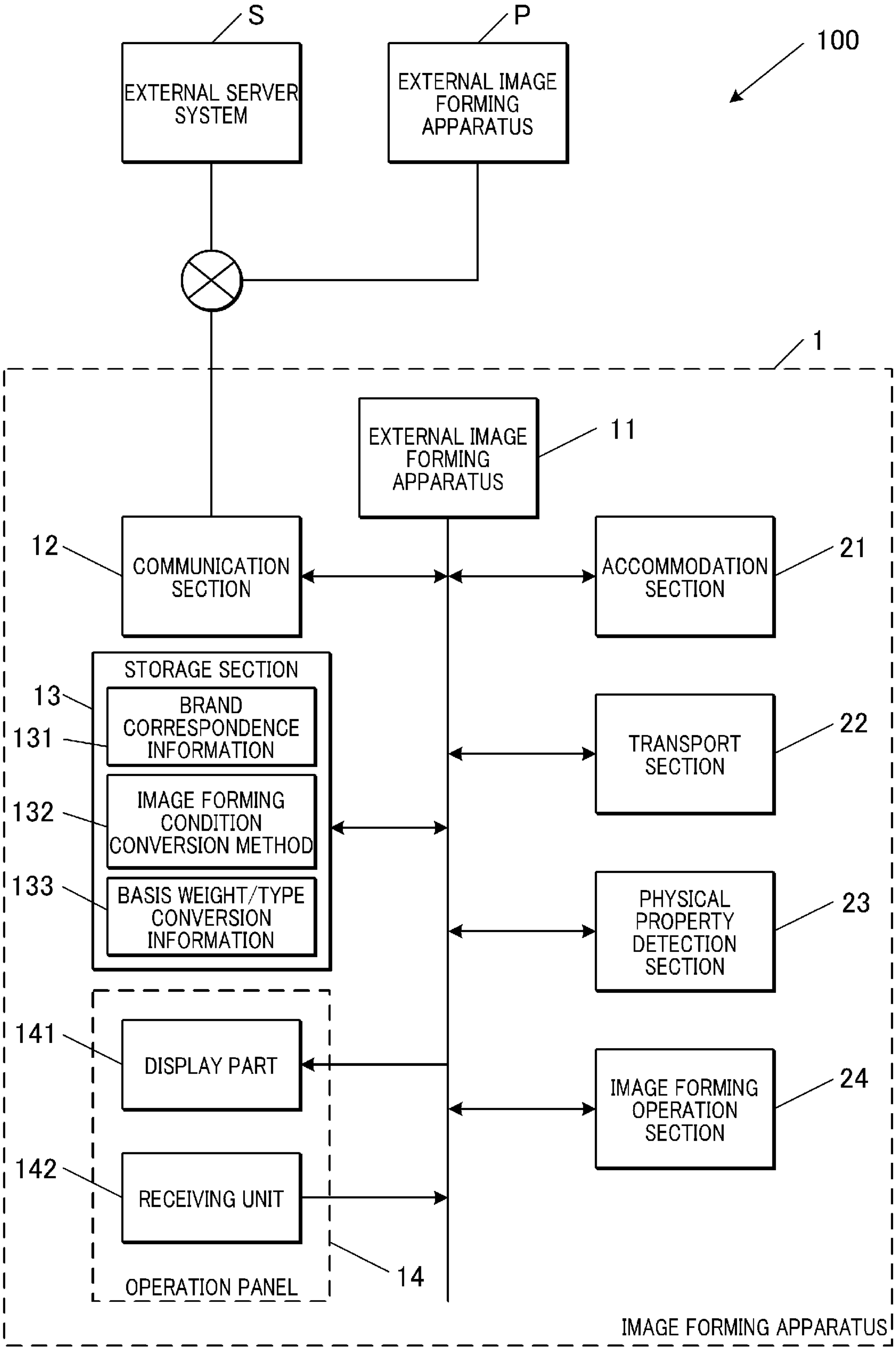
FIG. 1 illustrates a block diagram illustrating a functional configuration of an image forming system including an image forming apparatus according to the present embodiment.

FIG. 1 illustrates a block diagram illustrating the functional configuration of an image forming system 100 including the image forming apparatus 1 according to the present embodiment.

The image forming system 100 may include an image forming apparatus 1, an external server system S (server), an external image forming apparatus P (another image forming apparatus), and the like that are communicatively connected via a network. The external image forming apparatus P is located, for example, in the same LAN (wired LAN or wireless LAN) as the image forming apparatus 1 or in a virtual private network (VPN). The image forming system 100 does not have to include a device corresponding to the external image forming apparatus P.

The external server system S functions as a data bank that collects, holds, and manages information (predetermined data) on various recording media that are distributed worldwide and that can be used in the image forming apparatus 1. The information on the recording media includes a brand name, a manufacturer (it can include a sales agency and a distributor, which is the same below), and information on various characteristics (physical properties) of the each recording medium. The information on the characteristics may include what is officially announced and what is measured. The external server system S may be a single server device, or a separate database device or the like may be connected to a server device that performs control operation including control of communication with the image forming apparatus. The external server system S may be openly accessible, or may be accessible to a specific image forming apparatus 1 or a user thereof.

The number of external server systems S may not be one, and a plurality of mirror servers or the like that synchronously hold the same data may exist in the world. In the synchronization referred to here, a time lag that is small compared to an update interval may be allowed. In this case, the image forming apparatus 1 may automatically determine the optimum access destination in accordance with the installation area of the image forming apparatus 1, or may manually set the preferable access destination in accordance with an input operation to the receiving unit 142 by the user. The installation area may be determined from, for example, an IP address or the like, or may be information received and set by a user's input operation on the receiving unit 142. The access destination to be set is not limited to one. A plurality of locations may be set together with priority orders, and when access to an access target continually has been failed for a prescribed time or more, the image forming apparatus 1 may automatically change the access target to an access destination of a lower priority and access to it.

The image forming apparatus 1 forms an image by applying a color material such as toner or ink to a recording medium, and includes a controller 11, a communication section 12 (acquisition section), a storage section 13, an operation panel 14, an accommodation section 21, a transport section 22, a physical property detection section 23 (detection section), and an image forming operation section 24.

The controller 11 includes a hardware processor that controls various operations of image forming apparatus 1. The hardware processor includes a central processing unit (CPU) that performs arithmetic processing. The hardware processor may include a single CPU, or a plurality of CPUs that operate in parallel or independently depending on the use. The hardware processor may include a microcomputer other than dedicated logic circuits other than the general-purpose CPU.

The communication section 12 controls communication with an external device. The communication is performed in accordance with a predetermined communication standard. For example, the communication section 12 is capable of transmitting and receiving data in accordance with standards for a local area network (LAN) and/or WiFi. The communication section 12 includes a network card and the like, and can transmit a request and the like to an external device and receive (acquire) data and the like in response to the request. The external devices that are communication destinations include the server device of the external server system S and the external image forming apparatus P. The communication section 12 may have a connection terminal for a universal serial bus (USB) or the like. In a case where a USB connectable device such as a USB memory is connected to the connection terminal, the communication section 12 may be able to control data transmission and reception with the device.

The storage section 13 includes a volatile memory (RAM) and a nonvolatile memory. The RAM provides a working memory space for the CPU and the like of the controller 11, and stores temporary data. The non-volatile memory includes, for example, a hard disk drive (HDD) or a flash memory. A program for operation control, various setting data, and the like are stored in the non-volatile memory.

The setting data includes brand correspondence information 131, image forming condition conversion information 132, and basis weight/type conversion information 133. These will be described later.

The storage section 13 stores image data to be formed, driving data for driving the image forming operation section 24 converted from the image data, and the like. These pieces of data may be stored in the RAM while processing is being performed subsequent to the acquisition of the pieces of data. In a case where the image data and/or the driving data are/is continuously held after the image formation, in a case where a temporary process is interrupted or put on hold until the image formation after the acquisition, or in other cases, the image data and/or the driving data are appropriately moved to a nonvolatile memory and stored therein as necessary.

The operation panel 14 includes a display part 141 having a display screen, and a receiving unit 142 having a touch panel or the like positioned so as to overlap the display screen. The display screen is not particularly limited, but is a liquid crystal display screen, and can perform display in full color or in limited colors under the control of the controller 11. The display part 141 may include an LED lamp or the like as necessary. The LED lamp may be used for notification of a status or the like, or a plurality of LED lamps may be arranged to be used as an indicator or the like indicating a degree or the like (for example, a progress state of initial setting at the time of activation).

The touch panel generates signals based on a touch operation by a user or the like and a touch position (instruction operation), and outputs the generated signals to the controller 11. A method of detecting the touch operation may be any of well-known techniques, and is not particularly limited. The reception unit 142 may have other switches, for example, a push button switch, a locker switch, or a rotation switch. For example, an operation of a main power supply or an input operation related to power supply such as switching a standby state may be received by a specific push button switch or a rocker switch.

The accommodation section 21, the transport section 22, the physical property detection section 23, and the image forming operation section 24 are components corresponding to an actual image forming operation. The accommodation section 21 includes a tray (cassette) that accommodates a recording medium on which an image is formed. The accommodation section 21 may include a sensor that determines whether or not the recording medium is stored or that detects the size of the recording medium. The accommodation section 21 may include a plurality of trays, and any one is selected according to setting. At the time of image formation, a new recording medium is sent and supplied from the selected tray.

The transport section 22 sequentially sends out the recording medium taken out from the accommodation section 21, and moves and transports the recording medium along a transport path for discharging the recording medium through an image forming position and a fixing position. The transport section 22 may include, for example, rollers that nip the recording medium and move the recording medium at a speed and in a direction corresponding to their rotation, an endless belt, and a guide member that defines a transport direction. The transport section 22 may be capable of performing double-sided printing or switching a discharge destination (a tray or a post-processing apparatus) of the recording medium after image formation by appropriately moving the guide member to change the transport path.

The physical property detection section 23 is installed at a predetermined position on the transport path of the transport section 22, for example, on the downstream side of the accommodation section 21 and on the upstream side of a position where image formation is performed by the image forming operation section 24. The physical property detection section 23 includes a sensor which detects the physical property of the recording medium by measuring a physical quantity related to the physical property of the recording medium which is transported. The sensor includes, for example, a light emitting unit and a light receiving unit, emits light, and measures transmitted light intensity through the recording medium and reflected light intensity from the recording medium. That is, the physical property detection section 23 is set with respect to the transport path such that the recording medium is transported passing through the transport path between the light emitting unit and the light receiving unit of the transmitted light. The physical property detection section 23 may be capable of further distinguishing between the intensity of specular reflection light and the intensity of diffuse reflection light in the measurement of the intensity of reflection light. The light emitting unit is capable of emitting light of various wavelengths such as infrared (IR), blue (B), and green (G) light, and the light receiving unit is capable of measuring incident intensity for each of these wavelengths. In addition, the physical property detection section 23 may be capable of measuring the weight and thickness (that is, basis weight), bending strength, and the like of the recording medium.

The recording medium may be measured during temporary stop of the transport of the recording medium by the transport section 22 at a measurement position by the physical property detection section 23, where the recording medium passes before the image forming position, or during transport movement of the recording medium.

The position of the physical property detection section 23 may not be the above-described exemplary position, but it is preferable that the physical property detection section 23 can perform measurement so as not to be affected by a change in the state of a medium surface or the like due to an image forming operation and a fixing operation.

The image forming operation section 24 applies and fixes a color material onto the recording medium. The image forming operation section 24 includes, but not limited to, an engine that forms (develops) a toner image of 4 colors of CMYK or the like on a photoconductor by an electrophotographic method based on image data indicating a content to be formed and transfers the toner image to a recording medium via a transfer body to form an image. The image forming operation section 24 includes a fixing section that fixes the transferred toner on the recording medium by heating and pressing the toner with a roller or the like.

Next, a setting operation related to an image forming operation in the image forming apparatus 1 of the present embodiment will be described.

In the image forming apparatus 1, parameters (image forming conditions) such as pressure, temperature, and voltage are adjusted depending on the characteristics (physical properties) of the recording medium with regard to the conveyance of the recording medium along the transport path by the transport section 22 and the image formation by the image forming operation section 24. As a result, the image forming apparatus 1 is capable of stably conveying a recording medium with high accuracy, and applying and fixing a color material with high image quality. For this adjustment, the image forming apparatus 1 needs to appropriately acquire the physical property information of the recording medium.

As described above, the brand correspondence information 131, the image forming condition conversion information 132, and the basis weight/type conversion information 133 are stored and held in the storage section 13. The brand correspondence information 131 associates the brand of the recording medium used in the image forming apparatus 1 with the physical property value (range) of the recording medium of the brand measured by the physical property detection section 23. The image forming condition conversion information 132 defines an appropriate image forming condition for the physical properties of the recording medium. The basis weight/type conversion information 133 includes the correspondence between the physical property value and the basis weight of the recording medium and the type (kind, media type) of the recording medium.

In the image forming apparatus 1, an image forming condition corresponding to the physical property value of the recording medium measured by the physical property detection section 23 is obtained, and an image forming operation is performed on the recording medium under an appropriate image forming condition. Alternatively, the measured physical property value may be converted into a basis weight and a media type, and then the image forming condition may be obtained based on the basis weight and the media type.

Since the information of the brand and the media type specified from the physical property value is displayed and can be checked by the user, the information can be used as a standard for determining whether or not the recording medium is correctly specified as recognized by the user. The content to be displayed may further include information on the basis weight.

FIG. 2 is a table illustrating an example of the brand correspondence information 131.

Information on the physical property value measured by the physical property detection section 23 is associated with each brand of the recording medium. Examples of the information on the physical property value include a published value by a manufacturer, a representative value such as an average value obtained from measurement results of a large number of samples, and the like. The physical property value includes, for example, the transmittance through or reflectance by the recording medium of light of each wavelength as described above, or a combination thereof. With reference to the brand correspondence information 131, the image forming apparatus 1 can identify a brand for which the physical property value measured by the physical property detection section 23 is within a standard range and most closely matches.

However, since a large number of brands of recording media exist around the world and disappear or increase every day, it is difficult for the image forming apparatus 1 to hold and manage all information. Therefore, the image forming apparatus 1 appropriately acquires information (predetermined data) necessary for the apparatus itself from the outside (external device) and adds the information to the brand correspondence information 131. The image forming apparatus 1 refers to the data acquired from the outside, and can correctly specify the brand based on the data as long as the brand is included in the data. The data that has been added once is continuously available thereafter.

The image forming system 100 includes an external server system S and an external image forming apparatus P as an external device(s) of the image forming apparatus 1 that provide the above necessary information to the image forming apparatus 1. In addition to or in place of these, the external devices may also include a storage device such as a USB memory that can be connected (attached/detached) to/from a connection terminal of the communication section 12 of the image forming apparatus 1, and a portable storage medium such as a CD-ROM and a DVD that can be read and acquired from the image forming apparatus 1 by a reader. The USB memory may also store information acquired from an external server system S or the like via a PC or the like. That is, acquisition of information from the external server system S or the like by the image forming apparatus 1 may not be performed by direct communication.

A user inputs and sets in advance, through the receiving unit 142, a brand or the like of a recording medium to be used as an image formation target in the image forming apparatus 1, and thus the image forming apparatus 1 can obtain a list of physical property values corresponding to the brand from the outside. When the image forming apparatus 1 reads data such as a brand of the recording medium from a portable storage medium, the image forming apparatus 1 may cause the display part 141 to display a list of all brands stored in the portable storage medium such that the user performs a selection operation to specify a target to be read. The obtained physical property value may not be a single value but may have a range (width) of values. In addition to the physical property value, the media type and the detailed classification depending on the brand name may be acquired.

The paper media type include, for example, a plain paper, a coated paper, a recycled paper, a colored paper, an index paper, an envelope, and the like. These detailed classification can be set depending on, for example, the thickness and quality of paper (thick paper, thin paper, high-quality paper, and medium-quality paper). Media types other than paper may include resin films, stone papers, and the like.

Even in a case where the physical property detection section 23 does not directly measure the basis weight, the image forming apparatus 1 can specify (estimate) the basis weight and the media type based on the measurement results of the reflected light intensity by and the transmitted light intensity from the recording medium for each wavelength. The basis weight, which is the mass per unit area of the recording medium, is a parameter obtained from the thickness and mass (density) of the recording medium, and roughly corresponds to the combination of the media type and the physical property values relating to light transmission/reflection. Depending on the type of the medium and the basis weight thereof, at least a part of the amount of the color material required and the temperature, the current, the voltage, the pressure, and the like required for fixing the color material can be adjusted. The image forming apparatus 1 can also acquire the correspondence (another example of the predetermined data) between the physical property value and the basis weight detected by the physical property detection section 23 and the media type in this case from the outside in the same manner as the brand correspondence information 131 and store and hold a necessary portion as the basis weight type conversion information 133. Unlike the brand, the basis weight/type conversion information 133 does not change much with time. However, the image forming apparatus 1 does not have to hold conversion information on a recording medium of a type that is not usually used by a user of the image forming apparatus 1 in advance. The image forming apparatus 1 acquires the information of the recording medium from the external server system S or the like as necessary, thereby avoiding unnecessary data from occupying the storage capacity.

In a case where the image forming apparatus 1 acquires information from a source other than the portable storage medium, the access destination may be appropriately determined from among the external server system S (which may be a mirror server or the like as described above) and the external image forming apparatus P. For example, access to the external image forming apparatus P may be simply omitted. Alternatively, on the contrary, the image forming apparatus 1 may first access the external image forming apparatus P to check whether or not information of a desired brand (basis weight range, media type) is held. When the external image forming apparatus P holds desired information, the image forming apparatus 1 acquires the information from the external image forming apparatus P. In a case where the external image forming apparatus P does not hold information of a desired brand (basis weight range, media type), the image forming apparatus 1 may further access the external server system S to acquire the information.

FIG. 3 is a table illustrating an example of the basis weight/type conversion information 133.

Each brand is associated with a combination of a basis weight and a detection value. When the physical property values obtained based on the detection by the physical property detection section 23 matches and is within the standard range of these detection values, a combination of the basis weight and the media type according to the matching content is specified. Although the combination of the basis weight and the media type was described here, only one of the basis weight and the media type may be specified from the detection value based on the basis weight/type conversion information 133.

The information once stored in the storage section 13 may be deleted by an input operation or the like in a case where the information becomes unnecessary thereafter, and may be acquired again in a case where the information becomes necessary again.

Figure 4A:
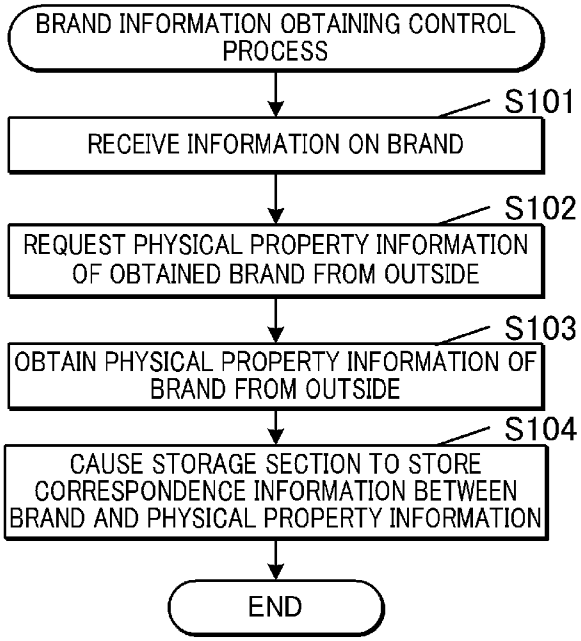
FIG. 4A is a flowchart illustrating a control procedure of a brand information obtaining control process.
Figure 4B:
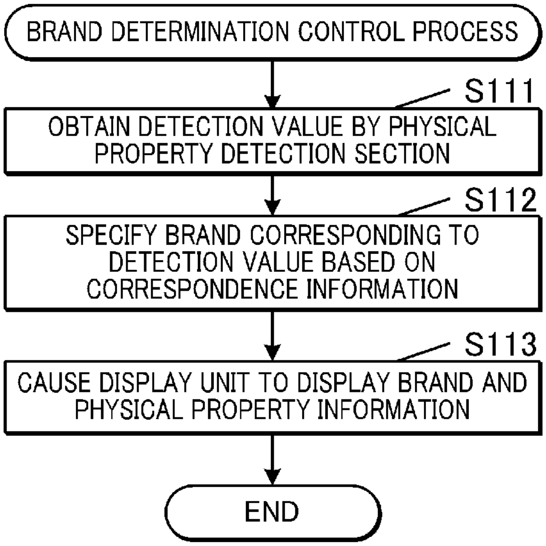
FIG. 4B is a flowchart illustrating a control procedure of a brand determination control process.

FIG. 4A is a flowchart showing a control procedure by the controller 11 of a brand information obtaining control process executed in the image forming apparatus 1. FIG. 4B is a flowchart illustrating a control procedure by the controller 11 of a brand determination control process. The brand information obtaining control process shown in FIG. 4A is started, for example, when a command to display a display screen related to the input of a brand for which physical property information is to be obtained on the display part 141 is obtained in response to reception of an input operation (instruction) of the receiving unit 142 by the user.

The controller 11 waits for an input operation on the display screen, and acquires the input brand name as a specification of a recording medium for which data is acquired (step S101). The controller 11 transmits the obtained brand name to the external configuration (such as the external server system S), and requests information relating to the physical properties of the recording medium corresponding to the brand (step S102).

The controller 11 waits for a reply from the outside, and receives and acquires information defining the correspondence relationship between the brand and the physical properties of the specified recording medium (step S103). The controller 11 additionally stores the obtained physical property information in the brand correspondence information 131 of the storage section 13 in association with the brand name (step S104). The controller 11 finishes the brand information obtaining control process.

The brand determination control process illustrated in FIG. 4B is executed, for example, when a user wants to check the identification status of a recording medium as the image formation target or a recording medium to be the image formation target.

The controller 11 causes the physical property detection section 23 to measure the target recording medium fed from the selected tray of the accommodation section 21 and acquires the detection value (step S111).

The controller 11 refers to the brand correspondence information 131 to specify the brand corresponding to the detection value detected by and acquired from the physical property detection section 23 (step S112). The controller 11 causes the display part 141 to display the specified brand and, if necessary, information relating to physical properties such as the detection values (information on the recording medium) (operation in the image forming apparatus 1) (step S113). Then, the controller 11 terminates the brand determination control process.

Figure 5A:
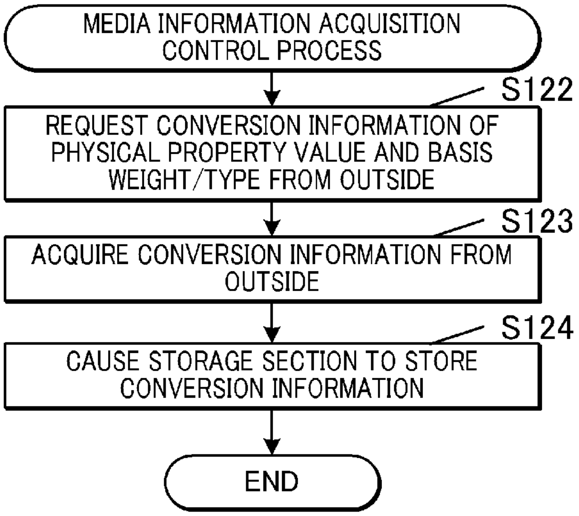
FIG. 5A is a flowchart illustrating a control procedure of a media information acquisition control process.
Figure 5B:
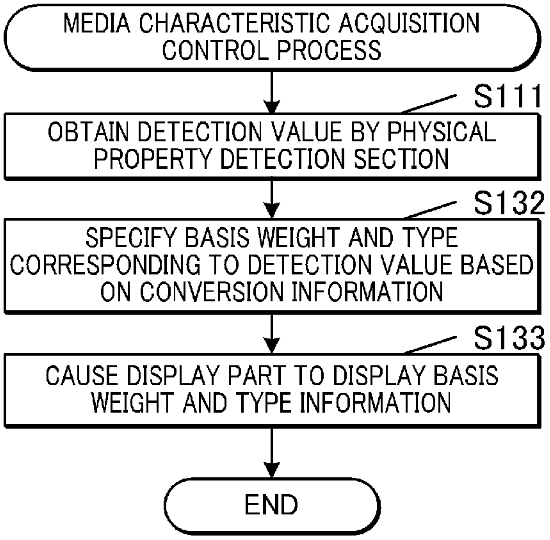
FIG. 5B is a flowchart illustrating a control procedure of a media characteristic acquisition control process.

FIG. 5A is a flowchart illustrating a control procedure performed by the controller 11 in a media information acquisition control process for obtaining the basis weight/type conversion information 133. FIG. 5B is a flowchart illustrating each of control procedures by the controller 11 in a media characteristic acquisition control process for obtaining a basis weight and a medium type based on the basis weight/type conversion information 133.

The medium information acquisition control process shown in FIG. 5A is started, for example, in response to a predetermined input operation to the receiving unit 142. This process may be executed at a desired timing in response to reception of an input operation (reception of an instruction) from the user, or may be automatically executed in an initial setting performed when the image forming apparatus 1 is activated for the first time after purchase (or in lending).

The controller 11 requests conversion information (data defining the relationship) between the physical property value, the basis weight, etc., and the media type from the outside, such as the external server system S (step S122). In this case, only a necessary part of the conversion information may be requested. In this case, the user may specify and request the required recording media (for example, the range of the basis weight and the media type) by an input operation on the receiving unit 142.

The controller 11 receives and obtains conversion information from the outside (step S123). The controller 11 additionally stores the acquired conversion information in the basis weight/type conversion information 133 (step S124). The controller 11 finishes the media information acquisition control process.

The media characteristic acquisition control process illustrated in FIG. 5B is executed, for example, when a user wants to check the identification status of a recording medium as the image formation target or to be the image formation target. This process includes step S111, which is also included in the brand determination control process in FIG. 4B, and further includes the processes of steps S132 and S133 in combination.

When the detection value is acquired in the process of step S111, the controller 11 refers to the basis weight/type conversion information 133 and specifies the basis weight and the media type corresponding to the detection value (step S132). The controller 11 causes the display part 141 to display the specified basis weight and media type (recording medium information) (step S133). This display is one of operations of the image forming apparatus controlled by the controller 11 of the image forming apparatus 1 of the present embodiment. The controller 11 finishes the media characteristic acquisition control process.

In the above description, the brand correspondence information 131 and the basis weight/type conversion information 133 are acquired in advance, and the image forming apparatus 1 specifies the brand and the basis weight/media type from the detection value. However, the image forming apparatus 1 may acquire the specification result of the basis weight and the media type from the outside (the external server system S) without acquiring the brand correspondence information 131 and the basis weight/type conversion information 133. In this case, the image forming apparatus 1 transmits a detection value to the outside (the external server system S). The external server system S specifies the brand, the basis weight, and the media type, and returns only the specification result to the image forming apparatus 1.

Figure 6:
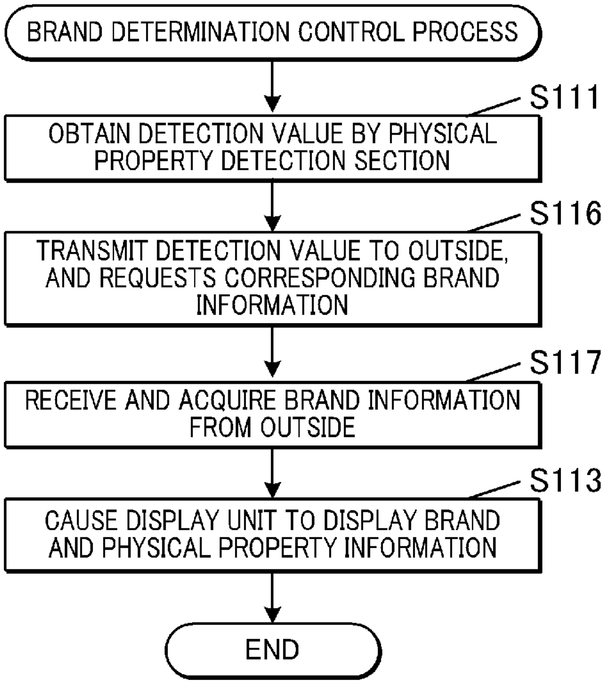
FIG. 6 is a flowchart illustrating another example of the brand identification control process.

FIG. 6 is a flowchart illustrating another example of the brand identification control process. In this brand determination control process, processes of steps S116 and S117 are added in place of the process of step S112 among the processes in FIG. 4B. The other processes are the same between FIGS. 4B and 6. The same processes are denoted by the same reference signs, and description thereof is omitted.

After the process of step S111, the controller 11 transmits the obtained detection value to the outside, and requests specification of the brand corresponding to the detection value (step S116). The controller 11 waits for a reply from the outside and receives and acquires data on the specified brand (step S117). The controller 11 moves the process to step S113.

Figure 7:
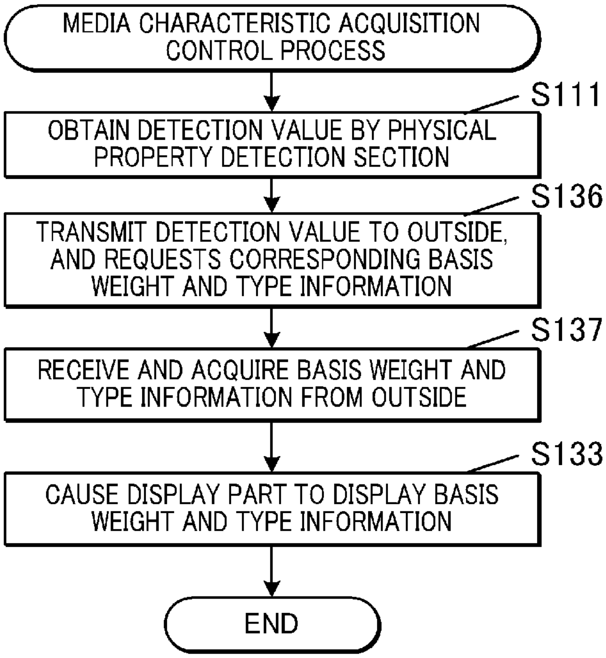
FIG. 7 is a flowchart showing another example of the media characteristic acquisition control process.

FIG. 7 is a flowchart showing another example of the media characteristic acquisition control process. This media characteristic acquisition control process is obtained by adding processes of steps S136 and S137 instead of the process of step S132 in the processing content illustrated in FIG. 5B as described above. The other processes are the same between FIGS. 5B and 7. The same processes are denoted by the same reference signs, and description thereof is omitted.

After the process of step S111, the controller 11 transmits the acquired detection value to the outside, and requests specification of the basis weight and the media type corresponding to the detection value (step S136). The controller 11 waits for a reply from the outside, and receives and obtains data of the specified basis weight and the media type (step S137). The controller 11 moves the process to step S133.

When an image is formed on such a recording medium by the image forming operation section 24, an image forming condition corresponding to the detection value by the physical property detection section 23 is set. The image forming operation section 24 appropriately forms an image in accordance with the image forming condition. The conversion (correspondence relationship) from the physical property values to the image forming condition may also be performed based on information from the outside.

FIG. 8 is a table showing an example of a correspondence relationship between physical property values and image forming conditions.

Here, predetermined image forming conditions are defined for combinations of certain physical property values (or ranges of physical property values). The image forming apparatus 1 acquires such a conversion table of the physical property value and the image forming condition, that is, a part or all of data defining the correspondence relationship between the physical property value and the image forming condition from the outside and holds the data as the image forming condition conversion information 132. When forming an image on a recording medium, the image forming apparatus 1 may refer to the image forming condition conversion information 132 to specify the image forming condition corresponding to the detection value of the physical property detection section 23. Similarly to the basis weight and the media type, the conversion information (correspondence relationship) does not change the conversion content itself which is once determined. However, the image forming apparatus 1 does not needs to hold, in advance, conversion information or the like for a recording medium of a type that is not normally used by the user. The image forming apparatus 1 can avoid unnecessary data from occupying the storage capacity by acquiring conversion information from the outside as necessary.

FIG. 9A is a flowchart illustrating a control procedure by the controller 11 in an image forming condition acquisition control process for obtaining the image forming condition conversion information 132. FIG. 9B is a flowchart showing a control procedure by the controller 11 in an image formation setting control process related to the setting of the image forming operation. The image forming condition acquisition control process is executed, for example, when an acquisition command of conversion information from the physical property value to the image forming condition is received by the receiving unit 142. Similarly to the media characteristic acquisition control process shown in FIG. 5A, the image forming condition acquisition control process may be automatically executed in the initial setting performed when the image forming apparatus 1 is activated for the first time after being purchased or in lending.

The controller 11 requests, from the outside, information on conversion from the physical properties to the image forming conditions (step S142). At this time, the controller 11 may specify and request only a part of the conversion information held by the outside. The specification may be made by the range of the physical property value, or may be made by the basis weight, the media type, or the like. In a case where the latter is possible, the external server system S only needs to have a correspondence relationship, such as a range of image forming conditions to be returned in response to the basis weight and media type. The external server system S or the like transmits some of the conversion information on the basis of the setting.

The controller 11 waits for a reply from the outside, and receives and acquires the conversion information from the outside (step S143). The controller 11 additionally stores the acquired conversion information in the image forming condition conversion information 132 in the storage section 13 (step S144). The controller 11 ends the image forming condition acquisition control process.

As described above, when an image is formed after the image forming condition is updated and acquired, the image forming apparatus 1 may simply use the image forming condition conversion information 132.

In the image formation setting control process shown in FIG. 9B, the controller 11 sets a recording medium as the image formation target (step S151). That is, here, the controller 11 selects and sets the accommodation section 21 (tray) in which the recording medium of the image forming target is accommodated.

The controller 11 causes the transport section 22 to convey the set recording medium, causes the physical property detector 23 to measure the recording medium, and acquires detection values as the results of the measurement (step S152). The controller 11 acquires the image forming condition corresponding to the detection value based on the image forming condition conversion information 132 (step S155). The controller 11 causes the image forming operation section 24 to perform, on the set recording medium, the image forming operation corresponding to the image data to be formed, under the acquired image forming condition (step S156). The controller 11 ends the image formation setting control process.

Alternatively, the update and acquisition of the image forming conditions may be performed together with the image formation setting when the command of the image forming operation is acquired.

Figure 10:
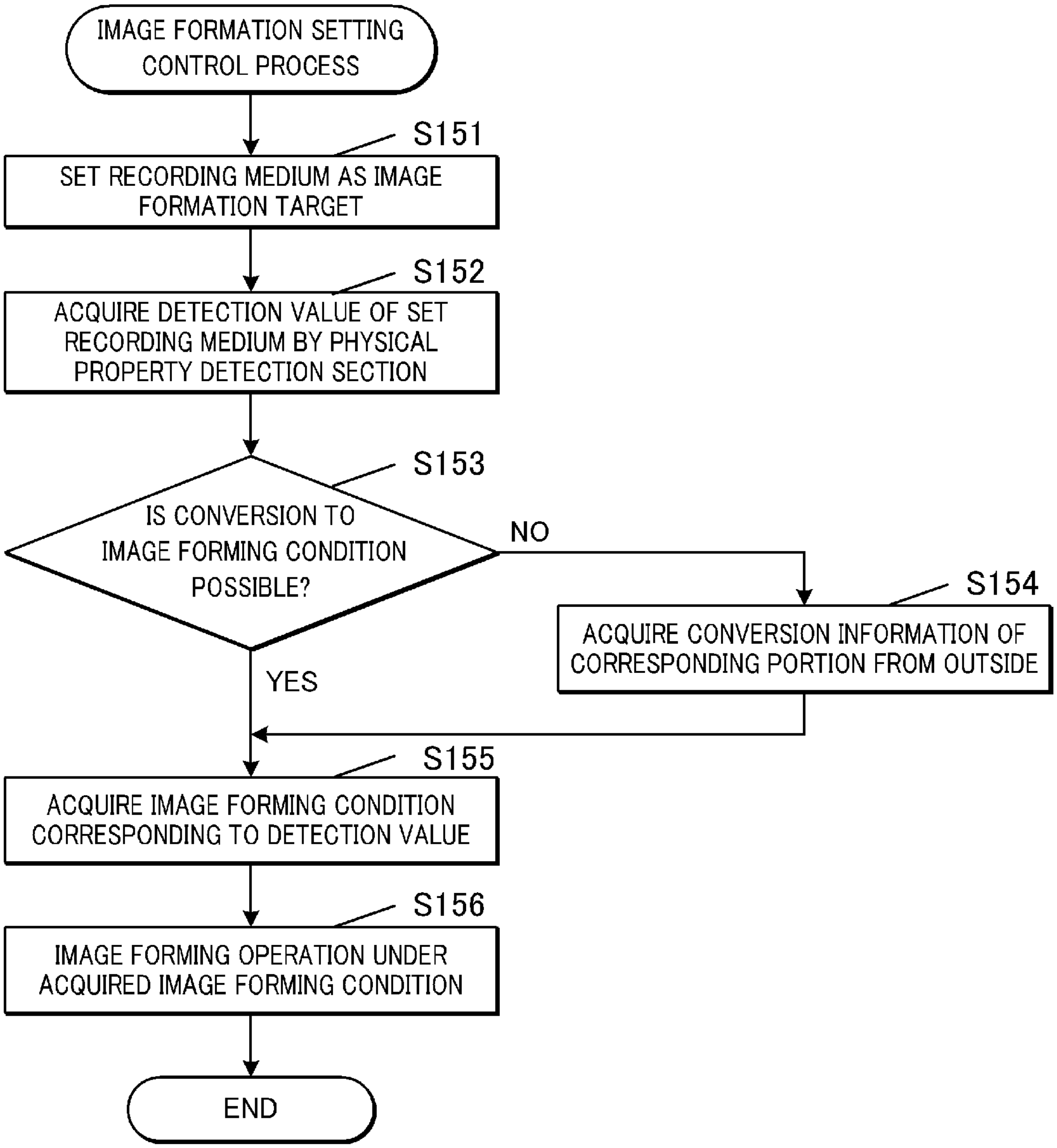
FIG. 10 is a flowchart showing a first modification example of the image formation setting control process.

FIG. 10 is a flowchart showing a first modification example of the image formation setting control process. The image formation setting control process of the first modification example is the same as the image formation setting control process illustrated in FIG. 9B except that processing of steps S153 and S154 is added, and the same processing content is appended with the same reference numerals and detailed description thereof will be omitted.

After the processing of step S152, the controller 11 determines whether or not the detection value is within a range that can be input to the image forming condition conversion information 132 and can be converted to the image forming condition (step S153). When it is determined that the conversion from the detection value to the image forming condition is not possible (step S153; NO), the controller 11 requests and acquires conversion information corresponding to the detection value from the outside (step S154). The obtained conversion information is additionally stored in the image forming condition conversion information 132. Then, the controller 11 moves the process to step S155. When it is determined that conversion from the detection value to the image forming condition is possible with the currently held image forming condition conversion information 132 (step S153; YES), the controller 11 moves the process to step S155.

Alternatively, the setting of the image forming condition may not be performed inside the image forming apparatus 1, and the setting performed outside such as the external server system S may be simply acquired and used.

FIG. 11 is a flowchart showing a second modification example of the image formation setting control process. In the image formation setting control process of the second modification example, processing of step S157 is executed instead of the processing of steps S153 and S154 in the image formation setting control process illustrated in FIG. 9B, and processing of step S155*a* is executed instead of the processing of step S155. The other processes are the same between FIG. 9B and FIG. 11. The same processes are denoted by the same reference numerals, and the description thereof is omitted.

After the processing of step 152, the controller 11 transmits the detection value to the outside and requests specification of a corresponding image forming condition (step S157). The controller 11 waits for a reply from the outside, and receives and acquires data on the specified image forming condition (step S155*a*). Then, the controller 11 moves the process to step S156.

The image forming condition may not be determined by using the detection value by the physical property detection section 23 as they are, but may be determined by converting the detected values into the basis weight and the media type. In this case, some detection values may be used together in addition to the basis weight and the media type.

In a case where the image forming condition is set based on a basis weight and a media type outside such as the external server system S and the image forming apparatus 1 acquires the settings, and processing for converting a detection value into the basis weight and the media type is also performed outside, processing of the controller 11 is not different from the image formation setting control process of the second modification example illustrated in FIG. 11 described above.

FIG. 12 is a flowchart showing a third modification example of the image formation setting control process. In the image formation setting control process of the third modification example, after the process of converting the detection value into the basis weight and the media type is performed, the conversion content is transmitted to the outside together with the setting request of the image forming condition. In this image formation setting control process, the process of step S132 shown in FIG. 5B is added to the image formation setting control process of the second modification example shown in FIG. 11, and the process of step S158 is executed instead of the process of step S157. The same reference numerals are given to the other same processing content. Processing other than the processing of step S158 has already been described, and a detailed description thereof will be omitted.

Subsequent to the processing of step S152, the controller 11 executes the processing of step S132 to specify the basis weight and the media type. The controller 11 transmits the specified basis weight and media type to the outside, and requests the image forming condition corresponding thereto (step S158). The controller 11 moves the process to step S155*a*.

Figure 13:
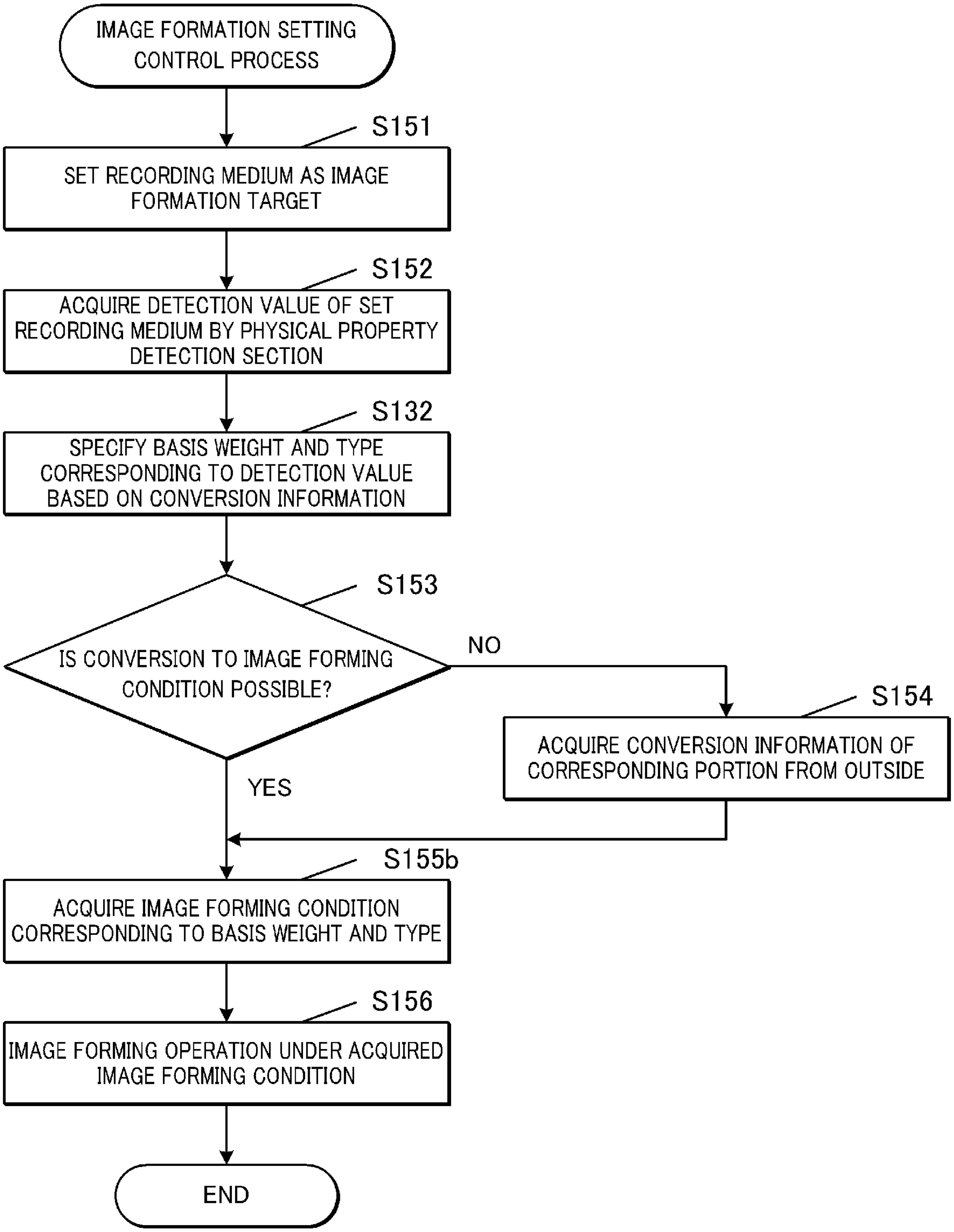
FIG. 13 is a flowchart showing a fourth modification example of the image formation setting control process.

FIG. 13 is a flowchart showing a fourth modification example of the image formation setting control process. The image formation setting control process of the fourth modification example is for a case where the image forming apparatus 1 acquires the image forming condition conversion information 132 and internally determines the image forming condition. In this image formation setting control process, the process of step S132 shown in FIG. 5B is added after the process of step S152 in the image formation setting control process of the first modification example shown in FIG. 10. The processing of step S155 is changed to processing of step S155*b*. The other processing is the same between the image formation setting control processes of the first modification example and the fourth modification example, and the same processing content is denoted by the same reference numerals. Since the processes other than step S155*b* have already been described, detailed description thereof will be omitted.

If YES in step S153, or after the process of step S154, the controller 11 refers to the image forming condition conversion information 132 to acquire image forming conditions corresponding to the obtained basis weight and media type (step S155*b*). Then, the controller 11 moves the process to step S156.

Note that the image forming condition conversion information 132 may be stored with the name of a setting mode mainly corresponding to the medium type and its detailed category. When the controller 11 causes the image forming operation section 24 to perform the image forming operation, the controller 11 may cause the display part 141 to display the setting mode, thereby at least indicating to the user that the image forming condition is apparently not erroneously set.

The image forming operation is performed based on the image forming condition acquired as described above. However, depending on the environmental state of the image forming apparatus 1, the characteristics of the physical property detection section 23, and the like, a slight variation and/or deviation may occur in the detection value. In such a case, the correspondence relationship of the information (the brand correspondence information 131, the image forming condition conversion information 132, and the basis weight/type conversion information 133) related to each correspondence relationship may be finely adjusted based on the measurement result, the non-approval action by the user, and the like.

For example, if a detection value is out of a range that is set as an original nominal range of the basis weight or the media type corresponding to the detection value, the specific range may be adjusted so as to include the detection value.

Figure 14:
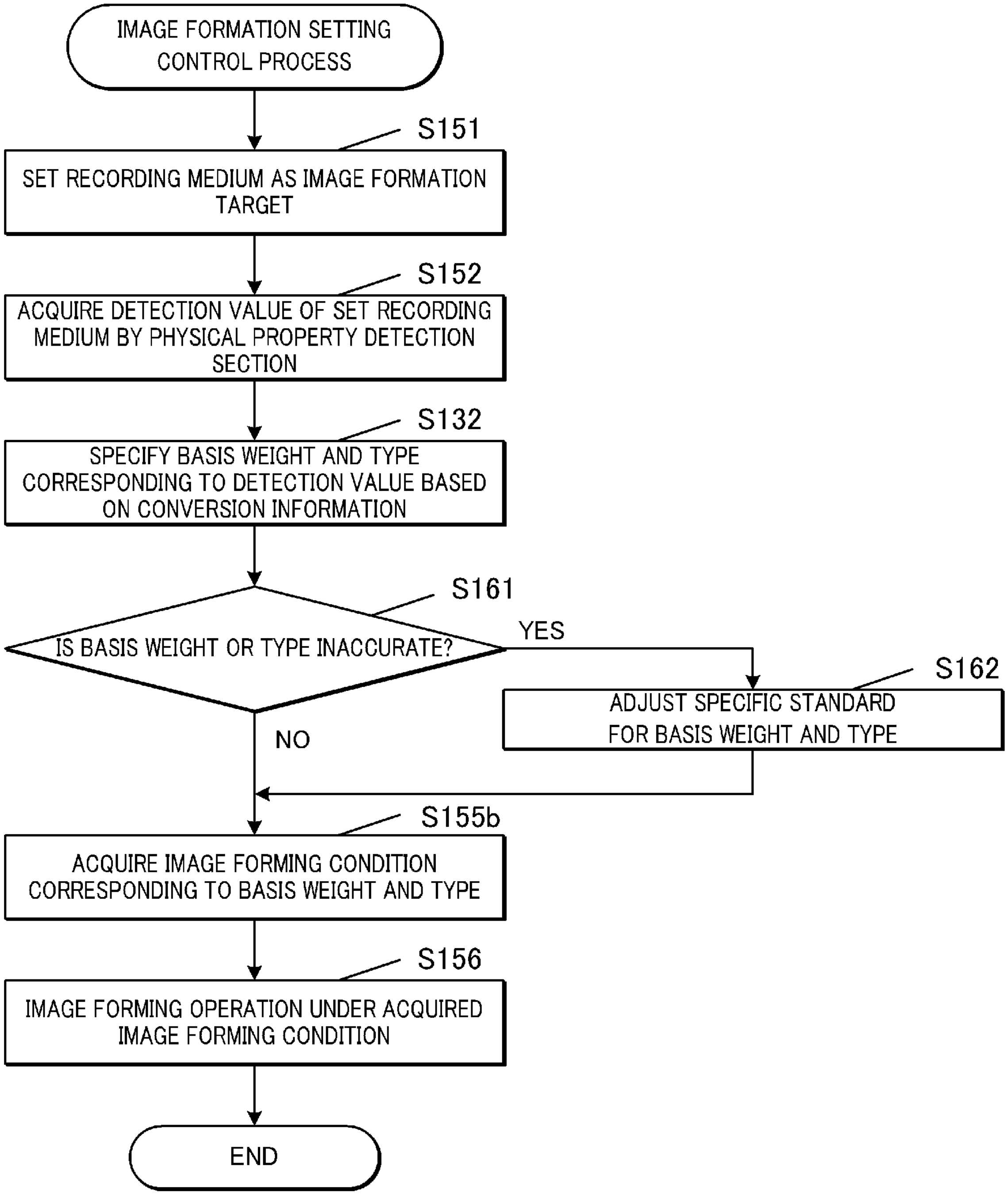
FIG. 14 is a flowchart showing a fifth modification of the image formation setting control process.

FIG. 14 is a flowchart showing a fifth modification example of the image formation setting control process.

The image formation setting control process of the fifth modification example includes processing of steps S161 and S162 instead of the processing of steps S153 and S154 in the image formation setting control process of the fourth modification example illustrated in FIG. 13. The other processes are the same between the both processes. The same processes are denoted by the same reference numerals, and detailed description thereof is omitted.

After the process of step 132, the controller 11 determines whether or not the specification result of the specified basis weight or media type is inaccurate (step S161). In this case, it is determined whether or not the inaccurate recognition is not due to the fact that the necessary information is not held as described above, but due to the shift of the acceptable error range.

In a case where it is determined that the specification result is inaccurate (step S161; YES), the controller 11 adjusts the range of the physical properties defined in the basis weight/type conversion information 133 (step S162). Then, the controller 11 moves the process to step S155*b*. When it is determined that the identification result is not inaccurate (is accurate) (step S161; NO), the controller 11 moves the process to step S155*b*.

The above-described adjustment processing may not be performed on each recording medium. For example, based on measurement results of a plurality of recording media that can be sufficiently statistically evaluated, their variation and bias may be quantitatively evaluated, and the adjustment processing may be performed based on the result of the quantitative evaluation.

As described above, the image forming apparatus 1 of the present embodiment that forms an image on a recording medium includes the physical property detection section 23 that detects the physical property of the recording medium, the communication section 12 that acquires predetermined data related to the recording medium from the outside of the image forming apparatus 1, and the controller 11 that controls the operation of the image forming apparatus 1 based on the detection value detected by the physical property detection section 23 and the predetermined data acquired by the communication section 12. Here, "based on" means not limited to a case where predetermined data or the like is used as it is. Any operation may be performed in the image forming apparatus 1 by directly or indirectly using the acquired predetermined data or the like.

In this way, by making it possible to acquire at least a part of the data relating to the recording medium from the outside, even if the image forming apparatus 1 does not hold all the information by itself, the image forming apparatus 1 can appropriately execute the processing such as specifying the recording medium and the characteristics thereof and performing the setting relating to the image formation more reliably. Therefore, the image forming apparatus 1 can simplify the work of the user while effectively suppressing a trouble of increased occurrence rate of the jam caused by the image formation with the inappropriate setting due to an error in the manual setting by the user or the omission of the manual setting by the user.

The predetermined data is, for example, data relating to the brand of the recording medium or data defining the relationship between the physical property value of the recording medium and the brand of the recording medium. As a result, even in the case of a recording medium that is newly distributed in the market and whose information is not held by the image forming apparatus 1 or a recording medium which is distributed outside the country where the image forming apparatus 1 is installed and is difficult to obtain in the country, the image forming apparatus 1 can appropriately acquire the information and specify the recording medium based on the physical property value. Therefore, the image forming apparatus 1 can reduce the possibility of incorrect specification.

The predetermined data is, for example, data relating to an image forming condition for forming an image on a recording medium, or data defining a relationship between a physical property value of a recording medium and an image forming condition for forming an image on the recording medium. As a result, the image forming apparatus 1 does not needs to previously hold all the data of the image forming conditions corresponding to the physical properties related to the type of the recording medium which is not normally used for the image formation in the image forming apparatus 1, and can replenish and use the data when necessary. Thus, the image forming apparatus 1 does not have to reserve an unnecessarily large storage capacity. The image forming apparatus 1 can easily update the information even when the image forming condition is finely adjusted in accordance with the change of the color material.

The predetermined data is, for example, data relating to the basis weight of the recording medium or the type of the recording medium, or data defining the relationship between the physical property value of the recording medium and the basis weight or the kind of the recording medium. The physical property value may not be directly used for setting of image forming conditions or specification of a brand, but is converted into a basis weight and a media type in some cases, such that the image forming condition and the brand are specified. Therefore, it is not necessary for the image forming apparatus 1 to previously hold all the information relating to the conversion of the basis weight and the media type including the type of the recording medium which is not used in the image forming apparatus 1 in the same manner as described above. Since the image forming apparatus 1 can easily additionally acquire these as necessary, it is possible to reduce the necessary storage capacity in the image forming apparatus 1.

The operation of the image forming apparatus 1 executed based on the predetermined data and the detection value of the physical property may include an operation of forming an image on the recording medium. Setting of the image forming condition is indispensable for normally forming an image with high image quality, and needs to be accurately determined. On the other hand, when all of the finely determined data is held in advance, the amount of data increases. Therefore, the image forming apparatus 1 acquires only necessary data from the outside and makes it possible to use the acquired data, thereby reducing a necessary storage capacity and easily and more reliably performing the image forming operation with high accuracy and a low failure occurrence rate.

The image forming apparatus 1 may include the display part 141 configured to display predetermined information, and the operation of the image forming apparatus 1 executed based on the predetermined data and the detection value of the physical property may include a displaying operation of displaying information of the recording medium specified by the image forming apparatus 1 on the display part 141. Accordingly, the user can determine whether the image forming apparatus 1 specifies the information of the recording medium as recognized by the user according to the display content.

The operation of the image forming apparatus 1 performed based on the predetermined data and the detection value of the physical property may include an operation of adjusting a condition for specifying the recording medium in the image forming apparatus 1. The value detected by the physical property detection section 23 may vary or deviate to some extent depending on the characteristics of the physical property detection section 23, the operating environment of the image forming apparatus 1, the quality of the recording medium itself, and the like. Therefore, more accurate identification is possible by appropriately adjusting the boundaries of the brand, basis weight, identification standard for media type, and the like. The brand correspondence information 131 and the basis weight/type conversion information 133, which are acquired from the outside and used for such identification, are average values in many image forming apparatuses. The image forming apparatus 1 can more accurately perform the identification by appropriately finely adjusting this.

The image forming apparatus 1 includes the receiving unit 142 that receives an instruction from a user. The communication section 12 acquires predetermined data when the receiving unit 142 receives an instruction from a user. That is, the image forming apparatus 1 can acquire predetermined data at a timing desired by a user, in accordance with an instruction from the user. As a result, the image forming apparatus 1 can appropriately additionally acquire the data based on instruction by the user only when necessary, and thus unnecessary data is unlikely to be held.

The receiving unit 142 receives, from a user, a specification as to which recording medium the predetermined data is to be acquired, and the communication section 12 receives and acquires the predetermined data on the recording medium specified by the receiving unit 142. As a result, the image forming apparatus 1 can appropriately additionally acquire only necessary data when necessary, and thus unnecessary data is less likely to be held.

The communication section 12 may acquire the predetermined data from another external image forming apparatus P connected to the network. When there is another image forming apparatus of the same model near the image forming apparatus 1 in the same LAN or the like, the possibility of using the same recording medium is high, and similar data is likely to be used. Therefore, by exchanging predetermined data between these image forming apparatuses, it is not necessary for each image forming apparatus to access the external server system S or the like, and data can be easily acquired and shared.

The communication section 12 acquires predetermined data from an external server system S which is connected to a network and holds the predetermined data. In this way, a data bank (database) for aggregating and managing predetermined data is prepared, and the image forming apparatus 1 can access and acquire data, so that each image forming apparatus 1 can efficiently acquire the aggregated data such as different image forming conditions based on physical property information and trouble occurrence information on many recording media. Since the image forming apparatus 1 can reliably obtain necessary information only by accessing the external server system S having a large amount of data and high accuracy, it is possible to suppress the occurrence of access to too much information before obtaining necessary data, manual settings, or image formation with incorrect setting due to abandonment of settings.

The communication section 12 may be connected to a storage medium such as a USB memory which stores predetermined data and which is connectable to the image forming apparatus 1, and may receive and acquire predetermined data from the storage medium. That is, the above-described information may be distributed by a portable storage medium or the like and taken into the image forming apparatus 1 from the storage medium, or may be acquired by a computer or the like and then copied and taken to the image forming apparatus 1 via a storage medium. By taking the information as in the former, each image forming apparatus 1 can efficiently acquire data particularly in a case where uniform update of predetermined data is necessary. By taking the information as in the latter, for example, even in a case where it is troublesome to input and specify desired data in the image forming apparatus 1, for example, in a case of a touch panel input, in a case where it is necessary to switch a narrow display screen as needed, or the like, the image forming apparatus 1 can easily copy and acquire information generated outside. In particular, since an input operation of characters and the like can be easily performed and information can be collectively generated by a combination of a display having a normal size and a keyboard that are used in a computer, time and effort are reduced. Since the information can be collectively acquired, it is possible to easily copy the acquired data. Thus, since it is not necessary to change the setting content of the image forming apparatus 1 by a remote computer, setting for security and the like is easy.

The image forming apparatus 1 includes a accommodation section 21 that contains recording media and a transport section 22 that transports the recording media contained in the accommodation section 21 along a transport path. The physical property detection section 23 is installed at a predetermined position of the transport path, and detects a physical property of the recording medium conveyed by the transport section 22. In this way, since the in-line sensor of the image forming apparatus 1 detects the physical property of the recording medium on the transport path of the recording medium, it is not necessary for the user to take out the recording medium and separately measure the physical properties outside, and it is not necessary to take time and effort to take the measurement result into the image forming apparatus 1 by communication, a storage medium, or the like. Further, according to the image forming apparatus 1, there is no problem of incorrect selection and setting of the tray in which the recording medium subjected to the physical property detection is accommodated. The image forming apparatus 1 can also check the recording medium as needed at the time of image formation. Therefore, the image forming apparatus 1 can easily and immediately detect an abnormal recording medium.

Note that the present disclosure is not limited to the above-described embodiments, and various modifications are possible.

For example, the data regarding the recording medium acquired from the outside may not be the information regarding the brand, the manufacturer information, the basis weight, the media type, and the image forming condition.

In the above-described exemplary embodiment, when the image forming apparatus 1 performs an operation for setting image forming conditions for an image forming operation and an operation for causing the display part 141 to display information such as the obtained brand, basis weight, and media type, the image forming apparatus 1 uses data (predetermined data) that relates to a recording medium and is obtained from the outside. However, the use of the predetermined data is not limited to these. The predetermined data may be used for other purposes.

Not all of the brand correspondence information 131, the image forming condition conversion information 132, and the basis weight/type conversion information 133 illustrated in the above-described embodiments may be acquired from the outside. For example, only the information originally stored and held in the image forming apparatus 1 may be used as the basis weight/type conversion information 133 etc.

The operations related to the image forming operation may include operations other than the direct operation of applying and fixing a color material onto a recording medium, for example, adjustment of a pinching distance and a pinching pressure by counter rollers included in the transport section 22.

Although it has been described in the aforementioned embodiment that the information relating to the brand, the information relating to the basis weight type, and the information relating to the setting of the image forming conditions (predetermined data), which are acquired from the outside, are used to directly obtain the data corresponding to the detection values of the physical properties, the present invention is not limited thereto, and the predetermined data may be processed as appropriate and used. Alternatively, the predetermined data may be used in combination with other parameters.

In the above-described embodiment, information on a recording medium is displayed on the display screen of the display part 141. However, the information on the recording medium may be displayed in other parts or ways. For example, the media type may be specified by an LED lamp of the display part 141 or the like.

Although the external server system S, the external image forming apparatus P, and a portable storage medium such as a USB memory have been described as examples of the external device (outside of the image forming apparatus 1) in the above embodiment, there is no limitation thereto. For example, a computer (PC) or the like functioning as a print server may appropriately acquire and hold information of the external server system S, and the image forming apparatus 1 may further acquire necessary information from the computer.

The image forming operation section 24 may not form an image by an electrophotographic method. Other methods, for example, image formation by an ink jet method of jetting ink may be performed.

As long as the physical property detection section 23 is an in-line sensor, the physical property detection may be performed, for example, in the accommodation section 21 instead of on the transport path.

The physical property detection section 23 may further have a configuration relating to detection other than the detection of the intensity of transmitted light/reflected light, the direct measurement of the basis weight etc., or the like.

The physical property detection section 23 may detect the physical properties by other methods.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An image forming apparatus that forms an image on a recording medium, comprising:

a detection section that detects a physical property of the recording medium as a detection value by irradiating the recording medium with light and measuring a transmitted light intensity through the recording medium;

an acquisition section is connected to an outside of the image forming apparatus including an external image forming apparatus and an external server system and acquires predetermined data related to the recording medium from the outside of the image forming apparatus; and a hardware processor that automatically checks whether the predetermined data corresponding to the physical property detected by the detection section has been previously acquired and stored in the image forming apparatus; and when the predetermined data has been previously acquired and stored, automatically controls an operation in the image forming apparatus based on the predetermined data in the image forming apparatus; and when the predetermined data has not been previously acquired and stored in the image forming apparatus, automatically sends the detection value detected by the detection section to a first external apparatus comprising one of the external image forming apparatus and the external server system, and, in a case where the first external apparatus does not hold the predetermined data, sends the detection value to a second external apparatus comprising the other of the external image forming apparatus and the external server system, wherein the acquisition section acquires the predetermined data from the outside based on the detection value, and controls an operation in the image forming apparatus based on the predetermined data acquired by the acquisition section from the outside.

2. The image forming apparatus according to claim 1, wherein the predetermined data is data regarding a brand of the recording medium or data defining a relationship between a physical property of the recording medium and the brand of the recording medium.

3. The image forming apparatus according to claim 1, wherein the predetermined data is data regarding an image forming condition under which an image is formed on the recording medium, or data defining a relationship between a physical property value of the recording medium and the image forming condition under which an image is formed on the recording medium.

4. The image forming apparatus according to claim 1, wherein the predetermined data is data regarding a basis weight of the recording medium or a kind of the recording medium, or data defining a relationship between a physical property value of the recording medium and the basis weight or the type of the recording medium.

5. The image forming apparatus according to claim 1, wherein the operation is a forming operation of forming an image on the recording medium.

6. The image forming apparatus according to claim 1, further comprising:

a display part that displays predetermined information;

wherein the operation is a displaying operation of displaying information of the recording medium specified in the image forming apparatus on the display part.

7. The image forming apparatus according to claim 1, wherein the operation is an adjusting operation of adjusting a condition under which the recording medium in the image forming apparatus is specified by adjusting boundaries of the physical property used for specifying the recording medium.

8. The image forming apparatus according to claim 1, wherein the acquisition section acquires the predetermined data from the external image forming apparatus that is connected to the image forming apparatus via a network.

9. The image forming apparatus according to claim 1, wherein the acquisition section acquires the predetermined data from the external server system that holds the predetermined data and is connected to the image forming apparatus via a network.

10. The image forming apparatus according to claim 1, wherein the acquisition section acquires the predetermined data from a storage medium that stores the predetermined data and is connectable to the image forming apparatus.

11. The image forming apparatus according to claim 1, further comprising:

an accommodation section that stores a recording medium; and a transport section that conveys the recording medium stored in the accommodation section along a transport path, wherein the detection section is installed at a predetermined position of the transport path and detects a physical property of the recording medium conveyed by the transport section.

12. The image forming apparatus according to claim 1, further comprising a storage that stores an image forming condition of the image forming apparatus which is associated with the physical property of the recording medium, wherein the hardware processor controls the operation in the image forming apparatus based on the image forming condition stored in the storage, the image forming condition being associated with the physical property detected by the detection section.

13. The image forming apparatus according to claim 12, wherein the hardware processor sends the detection value to the outside in response to that the storage does not store the image forming condition which is associated with the physical property detected by the detection section.

14. The image forming apparatus according to claim 1, wherein the acquisition section acquires the predetermined data related to the recording medium from the external image forming apparatus.

15. The image forming apparatus according to claim 1, wherein the detection section irradiates the recording medium with infrared light and measures the transmitted infrared light to detect a physical property of the recording medium.

16. The image forming apparatus according to claim 1, wherein the hardware processor specifies a basis weight of the recording medium based on the detection value of the physical property, determines whether the basis weight is accurately specified, and adjusts the acceptable error range if the basis weight is inaccurately specified.

17. An image forming apparatus that forms an image on a recording medium, comprising:

a detection section that detects a physical property of the recording medium as a detection value by irradiating the recording medium with light and measuring a reflected light intensity and/or a transmitted light intensity, wherein the detection section estimates a basis weight and/or a media type based on the reflected light intensity and/or the transmitted light intensity;

an acquisition section is connected to an outside of the image forming apparatus including an external image forming apparatus and an external server system and acquires predetermined data related to the recording medium from the outside of the image forming apparatus; and a hardware processor that automatically checks whether the predetermined data corresponding to the physical property detected by the detection section has been previously acquired and stored in the image forming apparatus; and when the predetermined data has been previously acquired and stored, automatically controls an operation in the image forming apparatus based on the predetermined data in the image forming apparatus; and when the predetermined data has not been previously acquired and stored in the image forming apparatus, automatically sends the detection value detected by the detection section to a first external apparatus comprising one of the external image forming apparatus and the external server system, and, in a case where the first external apparatus does not hold the predetermined data, sends the detection value to a second external apparatus comprising the other of the external image forming apparatus and the external server system, wherein the acquisition section acquires the predetermined data from the outside based on the detection value, and controls an operation in the image forming apparatus based on the predetermined data acquired by the acquisition section from the outside.

* * * * *